(12) United States Patent
Chikaoka (10) Patent No.: US 9,606,637 B2
(45) Date of Patent: Mar. 28, 2017

(54) PROJECTOR AND ELECTRONIC DEVICE HAVING PROJECTOR FUNCTION

(71) Applicant: Funai Electric Co., Ltd., Daito-shi, Osaka (JP)

(72) Inventor: Atsuhiko Chikaoka, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 244 days.

(21) Appl. No.: 14/244,458

(22) Filed: Apr. 3, 2014

(65) Prior Publication Data

US 2014/0300544 A1  Oct. 9, 2014

(30) Foreign Application Priority Data

Apr. 4, 2013 (JP) ................. 2013-078278

(51) Int. Cl.
| G06F 3/03 | (2006.01) |
| G06F 3/042 | (2006.01) |
| G06F 3/033 | (2013.01) |
| H04N 9/31 | (2006.01) |
| G06F 1/16 | (2006.01) |

(52) U.S. Cl.
CPC ............ G06F 3/0325 (2013.01); G06F 3/033 (2013.01); G06F 3/0423 (2013.01); H04N 9/3129 (2013.01); H04N 9/3194 (2013.01); G06F 1/1673 (2013.01)

(58) Field of Classification Search
None
See application file for complete search history.

(56) References Cited

U.S. PATENT DOCUMENTS

| 6,614,422 | B1* | 9/2003 | Rafii | G06F 1/1626 345/156 |
| 7,084,857 | B2* | 8/2006 | Lieberman | G06F 3/011 345/158 |
| 7,127,822 | B2* | 10/2006 | Kumagai | G01C 15/002 33/290 |
| 7,242,388 | B2* | 7/2007 | Lieberman | H03K 17/9638 345/156 |
| 8,373,678 | B2 | 2/2013 | Yamada | |
| 8,408,720 | B2 | 4/2013 | Nishigaki et al. | |
| 2001/0026363 | A1* | 10/2001 | Brinkman | G01B 11/26 356/138 |
| 2002/0075240 | A1* | 6/2002 | Lieberman | G06F 3/011 345/170 |

(Continued)

FOREIGN PATENT DOCUMENTS

| EP | 2 063 347 A1 | 5/2009 |
| EP | 2 239 650 A2 | 10/2010 |

(Continued)

*Primary Examiner* — Antonio Xavier
(74) *Attorney, Agent, or Firm* — Crowell & Moring LLP (57) ABSTRACT

A projector includes a laser beam scanning portion, a light detecting portion, and a control portion performing control of predicting a prediction region where a detection object exists on the basis of detection of the detection object, changing a modulation pattern of a laser beam when the laser beam is scanned on the prediction region, acquiring the position of the detection object on the basis of reflected light of the laser beam emitted in a detection object detection pattern, and setting the position of the detection object to an indication position.

21 Claims, 7 Drawing Sheets

(56) References Cited

U.S. PATENT DOCUMENTS

| | | | | |
|---|---|---|---|---|
| 2006/0077188 A1* | 4/2006 | Byun | G06F 3/0425 | 345/179 |
| 2006/0221063 A1* | 10/2006 | Ishihara | G06F 3/03545 | 345/173 |
| 2008/0018591 A1* | 1/2008 | Pittel | G06F 1/1616 | 345/156 |
| 2008/0112597 A1* | 5/2008 | Asano | G06K 9/00013 | 382/115 |
| 2010/0253618 A1* | 10/2010 | Nishigaki | G06F 3/0423 | 345/156 |
| 2011/0058109 A1* | 3/2011 | Nishigaki | G06F 3/0425 | 348/744 |
| 2012/0327037 A1* | 12/2012 | Su | G06F 3/0421 | 345/175 |
| 2013/0139093 A1* | 5/2013 | Kobayashi | G06F 3/04886 | 715/773 |
| 2013/0222892 A1* | 8/2013 | Jesme | G03B 21/132 | 359/352 |
| 2013/0229669 A1* | 9/2013 | Smits | G02B 26/101 | 356/614 |
| 2013/0234990 A1* | 9/2013 | Wang | G06F 3/0428 | 345/175 |
| 2014/0303522 A1* | 10/2014 | Akimoto | A61B 5/4561 | 600/594 |
| 2015/0253428 A1* | 9/2015 | Holz | G01S 17/42 | 356/5.01 |

FOREIGN PATENT DOCUMENTS

| | | |
|---|---|---|
| JP | 2009-258569 A | 11/2009 |
| JP | 2010-72504 A | 4/2010 |
| JP | 2010-113598 A | 5/2010 |
| JP | 2010-244484 A | 10/2010 |

\* cited by examiner

FIG.5
SCANNING LINE L0

FIG.6
SCANNING LINE L1

TIME PERIOD DURING WHICH LASER BEAM IS EMITTED TO DETECTION SECTION

FIG.7
SCANNING LINE L2

TIME PERIOD DURING WHICH LASER BEAM IS EMITTED TO DETECTION SECTION

*FIG.8*
SCANNING LINE L3

*FIG.9*
SCANNING LINE L4

FIG.10

PROJECTOR AND ELECTRONIC DEVICE HAVING PROJECTOR FUNCTION

BACKGROUND OF THE INVENTION

Field of the Invention

The present invention relates to a projector and an electronic device having a projector function, and more particularly, it relates to a projector and an electronic device having a projector function each including a light detecting portion.

Description of the Background Art

A projector including a light detecting portion is known in general, as disclosed in Japanese Patent Laying-Open No. 2010-244484.

The aforementioned Japanese Patent Laying-Open No. 2010-244484 discloses a projector including a scan mirror (laser beam scanning portion) scanning laser beams having an image formation pattern for forming an image on a projection surface and a light receiving element (light detecting portion) receiving reflected light scanned by the scan mirror, reflected by a detection object such as a pen. This projector further includes a control portion performing control of acquiring the position of the detection object and setting the position of the detection object to an indication position indicated by the detection object on the basis of reflected light of the laser beams having the image formation pattern, reflected by the detection object.

In the projector according to the aforementioned Japanese Patent Laying-Open No. 2010-244484, however, the position of the detection object is acquired on the basis of the reflected light of the laser beams having the image formation pattern, reflected by the detection object, and hence the position of the detection object is acquired on the basis of the reflected light of the laser beams in a modulation pattern (image formation pattern) changing according to a change in the image. In the reflected light reflected by the detection object, a component related to the shape of the detection object and a component related to the modulation pattern are mixed, and hence when the modulation pattern changes as the image formation pattern, it is difficult to clearly detect the component related to the shape of the detection object, and the accuracy of the indication position indicated by the detection object is reduced.

SUMMARY OF THE INVENTION

The present invention has been proposed in order to solve the aforementioned problem, and an object of the present invention is to provide a projector and an electronic device having a projector function each capable of accurately acquiring an indication position indicated by a detection object.

A projector according to a first aspect of the present invention includes a laser beam scanning portion scanning a laser beam having an image formation pattern for forming an image on a projection surface, a light detecting portion receiving reflected light of the laser beam scanned by the laser beam scanning portion, reflected by a detection object, and a control portion performing control of predicting a prediction region where the detection object exists on the basis of detection of the detection object, changing a modulation pattern of the laser beam to a detection object detection pattern when the laser beam is scanned on the prediction region, acquiring the position of the detection object on the basis of the reflected light of the laser beam emitted in the detection object detection pattern, and setting the position of the detection object to an indication position indicated by the detection object.

As hereinabove described, the projector according to the first aspect of the present invention is provided with the control portion performing control of predicting the prediction region where the detection object exists on the basis of the detection of the detection object, changing the modulation pattern of the laser beam to the detection object detection pattern when the laser beam is scanned on the prediction region, acquiring the position of the detection object on the basis of the reflected light of the laser beam emitted in the detection object detection pattern, and setting the position of the detection object to the indication position indicated by the detection object, whereby the laser beam changed to the detection object detection pattern suitable to detect the detection object is emitted to the prediction region where the detection object is predicted to exist, and hence a component related to the shape of the detection object can be clearly detected, unlike the case where the position of the detection object is acquired on the basis of the reflected light in the modulation pattern (image formation pattern) changing according to a change in the image. Consequently, the indication position indicated by the detection object can be accurately acquired. Furthermore, the position of the detection object is acquired and set to the indication position indicated by the detection object on the basis of the laser beam changed from the image formation pattern to the detection object detection pattern, and hence no dedicated laser beam source for detection different from laser beam sources for image formation may be provided, and hence complication of the structure of the projector can be suppressed. In addition, no laser beam for detection may be emitted to the image, and hence difficulty in visually confirming the image resulting from the laser beam for detection can be suppressed. Moreover, the indication position indicated by the detection object can be acquired by emitting the laser beam changed to the detection object detection pattern to the prediction region where the detection object is predicted to exist, and hence the indication position indicated by the detection object can be accurately acquired even in the case where the detection object exists at an arbitrary position in the projection surface, unlike the case where the laser beam for detection is emitted only to a part of the projection surface.

In the aforementioned projector according to the first aspect, the control portion is preferably configured to detect the detection object in a state where the modulation pattern of the laser beam is set to an image formation pattern and change the modulation pattern of the laser beam to the detection object detection pattern when the laser beam is scanned on the prediction region on the basis of the detection of the detection object. According to this structure, emission of the laser beam in the detection object detection pattern to an image region before the detection of the detection object can be suppressed, and hence inclusion of noise (pattern) in the image projected on the projection surface resulting from the emission of the laser beam in the detection object detection pattern can be suppressed.

In the aforementioned projector according to the first aspect, the control portion is preferably configured to acquire a centerline passing through a substantially central portion of a region where the detection object exists on the basis of the reflected light of the laser beam emitted in the detection object detection pattern and set the position of the detection object acquired on the basis of the centerline to the indication position indicated by the detection object.

According to this structure, the indication position indicated by the detection object can be easily accurately acquired on the basis of the centerline passing through the substantially central portion of the region where the detection object exists.

In this case, the control portion is preferably configured to set an intersection between the centerline and a first scanning line in which the detection object is detected to the indication position indicated by the detection object. According to this structure, the tip of the detection object can be acquired as the indication position on the basis of the centerline and the first scanning line in which the detection object is detected, and hence the indication position indicated by the tip of the detection object can be accurately acquired.

In the aforementioned structure in which the centerline is acquired, the control portion is preferably configured to acquire the centerline on the basis of the reflected light of the laser beam emitted in the detection object detection pattern in each of a plurality of scanning lines. According to this structure, the number of reflected laser beams employed to acquire the centerline can be increased, and hence the centerline can be accurately acquired.

In the aforementioned projector according to the first aspect, the control portion is preferably configured to set a pattern change section in which the modulation pattern of the laser beam is changed to the detection object detection pattern in the prediction region in a scanning line scanned subsequent to a prescribed scanning line on the basis of the detection of the detection object in the prescribed scanning line. According to this structure, the pattern change section can be set in the scanning line subsequent to the prescribed scanning line in a direction in which the detection object is predicted to extend after the detection object is detected, and hence the indication position indicated by the detection object can be more accurately acquired.

In this case, the control portion is preferably configured to control the modulation pattern to emit the laser beam of a single color as the detection object detection pattern to the pattern change section. According to this structure, the position of the detection object can be acquired and set to the indication position indicated by the detection object on the basis of the laser beam of the single color remaining unchanged in color (having constant gradations), and hence the indication position indicated by the detection object can be more accurately acquired.

In the aforementioned structure in which the laser beam of the single color is emitted to the pattern change section, the control portion is preferably configured to control the modulation pattern to emit the laser beam of a white or red color as the detection object detection pattern. According to this structure, even in the case where the pattern change section is set in a state deviated from the detection object, a reduction in the quality of the image can be suppressed while the indication position indicated by the detection object is accurately acquired when the laser beam of the white color is emitted. Furthermore, red reflected light reflected by the detection object can be easily received when the laser beam of the red color is emitted, and hence the indication position indicated by the detection object can be more accurately acquired.

In the aforementioned structure in which the laser beam of the single color is emitted to the pattern change section, the projector preferably further includes red, green, and blue laser beam sources emitting laser beams of colors different from each other to the laser beam scanning portion, and the control portion is preferably configured to control the red, green, and blue laser beam sources to change the modulation pattern of the laser beams emitted from the red, green, and blue laser beam sources to the detection object detection pattern of the single color when the laser beams are scanned on the prediction region. According to this structure, the indication position indicated by the detection object in the image displayed in colors can be accurately acquired.

In the aforementioned structure in which the pattern change section is set in the prediction region, the control portion is preferably configured to set the pattern change section in correspondence to the detection position of the detection object in at least a single scanning line immediately prior to a scanning line in which the pattern change section is set. According to this structure, the pattern change section can be easily set by setting the prediction region in a direction along the detection object, and hence setting of the pattern change section at a position not corresponding to the detection object can be easily suppressed.

In this case, the control portion is preferably configured to set the pattern change section in correspondence to detection positions of the detection object in a plurality of scanning lines including an immediately prior single scanning line. According to this structure, the setting of the pattern change section at the position not corresponding to the detection object can be more easily suppressed.

In the aforementioned structure in which the pattern change section is set in the prediction region, the control portion is preferably configured to perform control of setting the width of the pattern change section to be smaller than the width of the prediction region of the detection object in the scanning direction of the scanning line. According to this structure, protrusion of the laser beam emitted in the detection object detection pattern from the prediction region can be suppressed, and hence inclusion of noise in the image projected on the projection surface resulting from the protrusion of the laser beam in the detection object detection pattern from the prediction region can be suppressed.

In this case, the pattern change section preferably includes a detection section in which the modulation pattern of the laser beam is changed to the detection object detection pattern, and the control portion is preferably configured to perform control of emitting the laser beam having a modulation range more restricted than the modulation pattern of an image region where the image is formed to adjustment sections located on both sides of the detection section in the prediction region of the detection object. According to this structure, the adjustment sections located on both sides of the detection section are provided, whereby the laser beam in the image formation pattern can be brought close to a laser beam in the detection object detection pattern in sections between the detection section and the image region, and hence the image can be visually confirmed without a sense of incongruity.

In the aforementioned structure in which the pattern change section includes the detection section, the control portion is preferably configured to restrict a gradation value of the laser beam emitted to regions of the adjustment sections closer to the detection section to be smaller. According to this structure, a change in color per gradation can be reduced, and hence the adjustment sections are provided, whereby the laser beam in the image formation pattern can be gradually brought close to the laser beam in the detection object detection pattern in the sections between the detection section and the image region.

In the aforementioned structure in which the pattern change section includes the detection section, the adjustment sections located on both sides of the detection section preferably have widths substantially equal to each other in the scanning direction of the scanning line. According to this structure, the adjustment sections can be arranged on both sides of the detection section in a balanced manner.

In the aforementioned structure in which the pattern change section is set in the prediction region, the control portion is preferably configured to change the modulation pattern of the laser beam emitted to the pattern change section to the detection object detection pattern during a period until a frame subsequent to a frame in which the detection object is detected is displayed after the detection object is detected. According to this structure, the overall detection object in the frame can be easily detected with the laser beam changed from the modulation pattern to the detection object detection pattern.

In the aforementioned structure in which the pattern change section is set in the prediction region, the control portion is preferably configured to set the pattern change section on the basis of acquired information of the detection object in a frame prior to a frame in which the detection object is detected when the indication position indicated by the detection object is acquired in the frame prior to the frame in which the detection object is detected. According to this structure, the pattern change section can be set at a proper position on the basis of the detection of the detection object and the acquired information of the detection object in the prior frame.

In the aforementioned structure in which the pattern change section includes the detection section, the control portion is preferably configured to acquire the centerline passing through the substantially central portion of the region where the detection object exists on the basis of data of the detection position of the detection object in the case where a difference between the detection position of the detection object and the position of a center point of the detection section in the scanning direction of the scanning line is not more than a prescribed value. According to this structure, the accuracy of the acquired centerline can be improved by excluding data of the detection position of the detection object based on reflected light in a pattern other than the detection object detection pattern acquired in the case where the difference between the detection position of the detection object and the center point of the detection section in the scanning direction of the scanning line is more than the prescribed value (in the case where the detection object is in a section (place) other than the detection section, for example).

In the aforementioned structure in which the pattern change section is set in the prediction region, the control portion is preferably configured to perform control of acquiring the width of the detection object in the scanning direction and setting the width of the pattern change section to be smaller than the width of the detection object in a direction along the scanning direction. According to this structure, protrusion of the laser beam emitted in the detection object detection pattern from the detection object can be suppressed, and hence the reduction in the quality of the image resulting from the protrusion of the laser beam in the detection object detection pattern from the detection object can be suppressed.

An electronic device having a projector function according to a second aspect of the present invention includes a laser beam scanning portion scanning a laser beam having an image formation pattern for forming an image on a projection surface, a light detecting portion receiving reflected light of the laser beam scanned by the laser beam scanning portion, reflected by a detection object, and a control portion performing control of predicting a prediction region where the detection object exists on the basis of detection of the detection object, changing a modulation pattern of the laser beam to a detection object detection pattern when the laser beam is scanned on the prediction region, acquiring the position of the detection object on the basis of the reflected light of the laser beam emitted in the detection object detection pattern, and setting the position of the detection object to an indication position indicated by the detection object.

As hereinabove described, the electronic device having a projector function according to the second aspect of the present invention is provided with the control portion performing control of predicting the prediction region where the detection object exists on the basis of the detection of the detection object, changing the modulation pattern of the laser beam to the detection object detection pattern when the laser beam is scanned on the prediction region, acquiring the position of the detection object on the basis of the reflected light of the laser beam emitted in the detection object detection pattern, and setting the position of the detection object to the indication position indicated by the detection object, whereby the laser beam changed to the detection object detection pattern suitable to detect the detection object is emitted to the prediction region where the detection object is predicted to exist, and hence a component related to the shape of the detection object can be clearly detected, unlike the case where the position of the detection object is acquired on the basis of the reflected light in the modulation pattern (image formation pattern) changing according to a change in the image. Consequently, the indication position indicated by the detection object can be accurately acquired. Furthermore, the position of the detection object is acquired and set to the indication position indicated by the detection object on the basis of the laser beam changed from the image formation pattern to the detection object detection pattern, and hence no dedicated laser beam source for detection different from laser beam sources for image formation may be provided, and hence complication of the structure of the electronic device having a projector function can be suppressed. In addition, no laser beam for detection may be emitted to the image, and hence difficulty in visually confirming the image resulting from the laser beam for detection can be suppressed. Moreover, the indication position indicated by the detection object can be acquired by emitting the laser beam changed to the detection object detection pattern to the prediction region where the detection object is predicted to exist, and hence the indication position indicated by the detection object can be accurately acquired even in the case where the detection object exists at an arbitrary position in the projection surface, unlike the case where the laser beam for detection is emitted only to a part of the projection surface.

According to the present invention, as hereinabove described, the indication position indicated by the detection object can be accurately acquired.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is hereinafter described with reference to the drawings.

The structure of a projector 1 according to the embodiment of the present invention is now described with reference to FIGS. 1 to 10. The projector 1 is an example of the "electronic device having a projector function" in the present invention.

Figure 1:
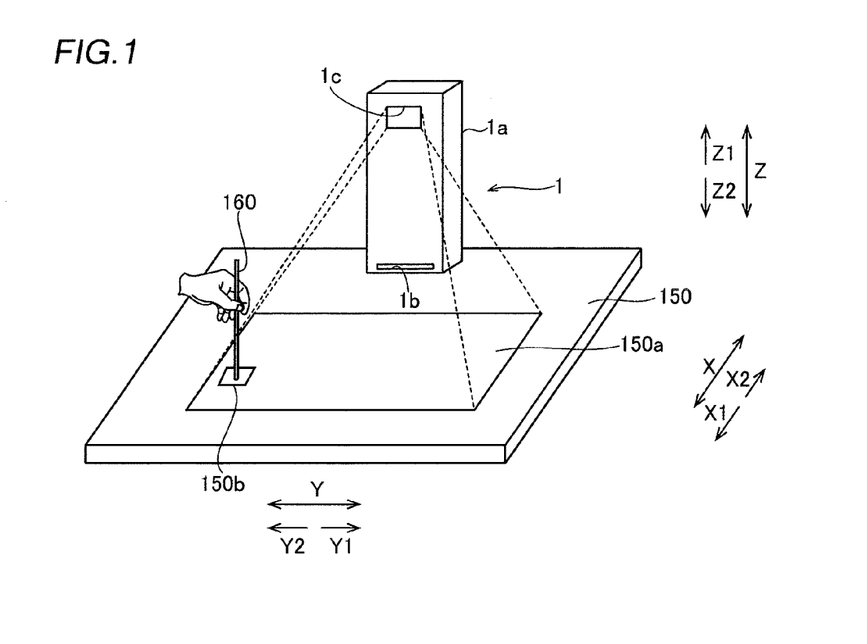
FIG. 1 is a schematic view showing the used state of a projector according to an embodiment of the present invention.

The projector 1 according to the embodiment of the present invention is configured to be used in a state arranged on a table 150 or the like, as shown in FIG. 1. The projector 1 is a front projector projecting an image (picture) 150b such as an icon (button) selected by a user on a projection surface 150a such as the table 150 from the front side. The projector 1 is configured to project the image 150b from a side (Z1 side) on which the user visually confirms the image 150b. Furthermore, a detection object 160 such as the finger of the user or a pen touches the image 150b projected on the projection surface 150a, whereby the projector 1 is operated. The projector 1 includes an opening 1b configured to take laser beams reflected by the detection object 160 in a housing 1a on the lower side (Z2 side). The opening 1b is provided in a side surface on the side (X1 side) of the housing 1a closer to the projection surface 150a. The projector 1 includes an opening 1c configured to emit laser beams outward from the housing 1a on the upper side (Z1 side). The opening 1c is provided in the same side surface on the side of the housing 1a closer to the projection surface 150a as the opening 1b.

Figure 2:
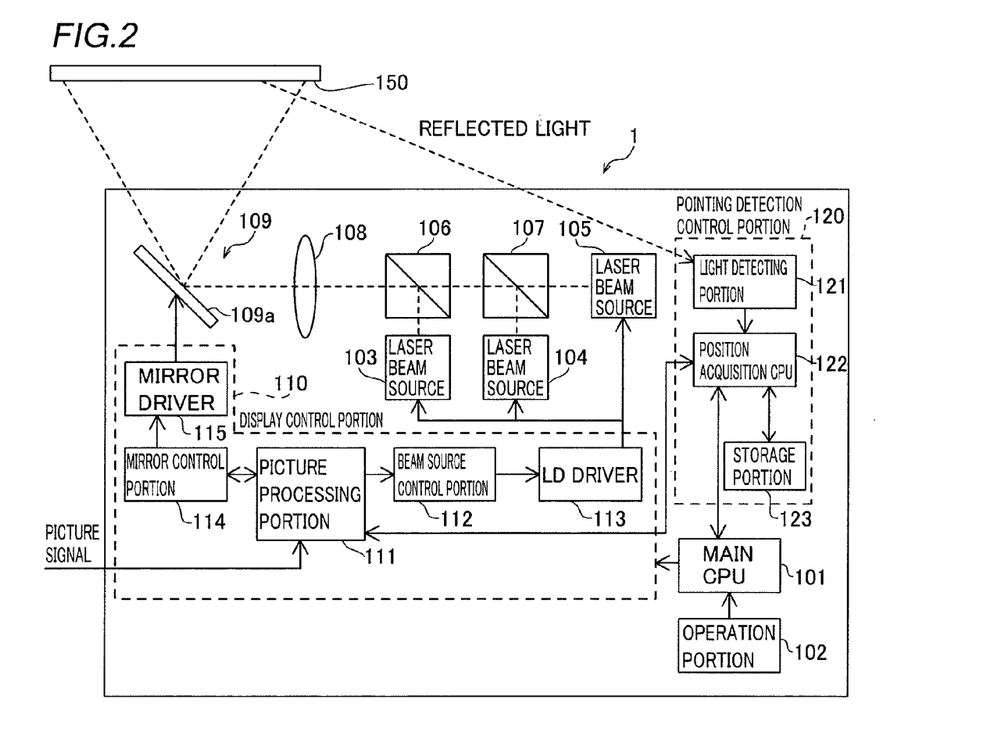
FIG. 2 is a block diagram showing the structure of the projector according to the embodiment of the present invention.

The projector 1 includes a main CPU 101, an operation portion 102, three (blue (B), green (G), and red (R)) laser beam sources 103 to 105, two beam splitters 106 and 107, a lens 108, a laser beam scanning portion 109, a display control portion 110, and a pointing detection control portion 120, as shown in FIG. 2. The image 150b projected on the projection surface 150a is formed by the laser beam sources 103 to 105 for image formation. The laser beam scanning portion 109 includes a MEMS (Micro Electro Mechanical System) mirror 109a. The laser beam scanning portion 109 is configured to scan laser beams on the projection surface 150a (see FIG. 1). The display control portion 110 includes a picture processing portion 111, a beam source control portion 112, an LD (laser diode) driver 113, a mirror control portion 114, and a mirror driver 115. The projector 1 is configured to output the image 150b on the basis of a picture signal input in the picture processing portion 111. The pointing detection control portion 120 includes a light detecting portion 121, a position acquisition CPU 122, and a storage portion 123. The position acquisition CPU 122 is configured to detect the touch position of the detection object 160 (that prescribed coordinates have been touched) on the basis of laser beams detected by the light detecting portion 121.

The main CPU 101 is configured to control each portion of the projector 1. The operation portion 102 is provided to accept operations of turning on the projector 1, changing the projection angle of the image 150b, changing the resolution of the image 150b, etc. The main CPU 101 is configured to control the display control portion 110 (beam source control portion 112) with respect to an operation such as emission of the laser beam sources 103 to 105. Furthermore, the main CPU 101 is configured to control the pointing detection control portion 120 (position acquisition CPU 122) with respect to an operation such as acquisition of the position of the detection object 160. The main CPU 101 is described later in detail. The main CPU 101 is an example of the "control portion" in the present invention.

The laser beam source 103 is configured to emit a blue laser beam to the MEMS mirror 109a through the beam splitter 106 and the lens 108. The laser beam sources 104 and 105 are configured to emit a green laser beam and a red laser beam, respectively, to the MEMS mirror 109a through the beam splitters 107 and 106 and the lens 108. The laser beam sources 103 to 105 are configured to be capable of emitting the laser beams corresponding to colors of 0 to 255 gradations.

Figure 3:
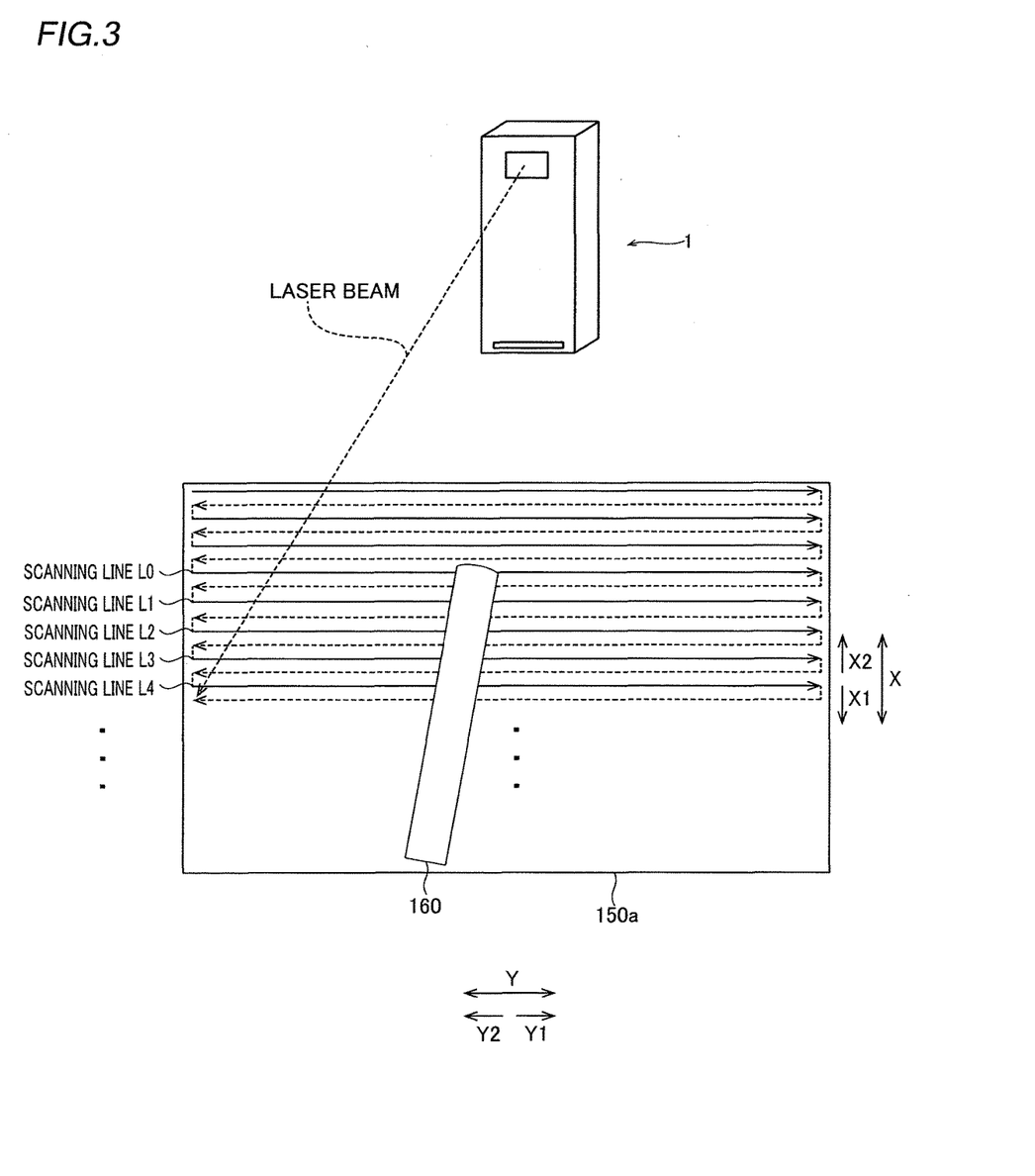
FIG. 3 is a diagram showing scanning lines of the projector according to the embodiment of the present invention.

According to this embodiment, the laser beam scanning portion 109 is configured to scan (project) laser beams having an image formation pattern for forming the image 150b on the projection surface 150a. Specifically, the laser beam scanning portion 109 (MEMS mirror 109a) is configured to scan the laser beams emitted from the laser beam sources 103 to 105 and project the image 150b on the projection surface 150a. As shown in FIG. 3, the MEMS mirror 109a is configured to be driven in two-dimensional directions to scan the laser beams in a horizontal direction (direction Y) and a vertical direction (direction X). More specifically, the laser beam scanning portion 109 is configured to draw the image 150b (project the laser beams corresponding to the image 150b) when scanning the laser beams in one direction (direction Y2 or Y1). The MEMS mirror 109a is configured to scan the horizontal direction (direction Y) at a high speed by resonance driving and to scan the vertical direction (direction X) at a low speed by DC driving.

The picture processing portion 111 is configured to control the projection of the picture on the basis of the picture signal externally input. Specifically, the picture processing portion 111 is configured to control the driving of the MEMS mirror 109a through the mirror control portion 114 and control the emission of the laser beams from the laser beam sources 103 to 105 through the beam source control portion 112 on the basis of the picture signal externally input. Furthermore, the picture processing portion 111 is configured to correct the distortion of the projected image 150b.

The beam source control portion 112 is configured to control the LD driver 113 on the basis of control performed by the picture processing portion 111 and control the emission of the laser beams from the laser beam sources 103 to 105. Specifically, the beam source control portion 112 is configured to control the laser beam sources 103 to 105 to emit the laser beams of colors corresponding to pixels of the image 150b in synchronization with the scanning timing of the MEMS mirror 109a.

The mirror control portion 114 is configured to control the mirror driver 115 on the basis of the control performed by the picture processing portion 111 and control the driving of the MEMS mirror 109a.

According to this embodiment, the light detecting portion 121 is configured to detect reflected light of the laser beams scanned by the laser beam scanning portion 109, reflected by the detection object 160. The light detecting portion 121 mainly includes a photodiode.

The position acquisition CPU 122 is configured to acquire the position of the detection object 160 on the basis of time information about the time when the light detecting portion 30 has detected the laser beams reflected by the detection object 160 and the scan trajectories of the laser beams. Specifically, the position acquisition CPU 122 acquires the position (coordinates) of the detection object 160 corresponding to the image 150b by specifying on which positions (coordinates) the detected laser beams are scanned on the basis of an elapsed time up to detection of the laser beams from a horizontal synchronizing signal and the scan trajectories of the laser beams. In other words, the position acquisition CPU 122 calculates the coordinates of the detection object 160 on the projection surface 150a on the basis of the timing at which the light detecting portion 30 detects the laser beams reflected by the detection object 160 and a scan position scanned by the laser beam scanning portion 109.

Figure 4:
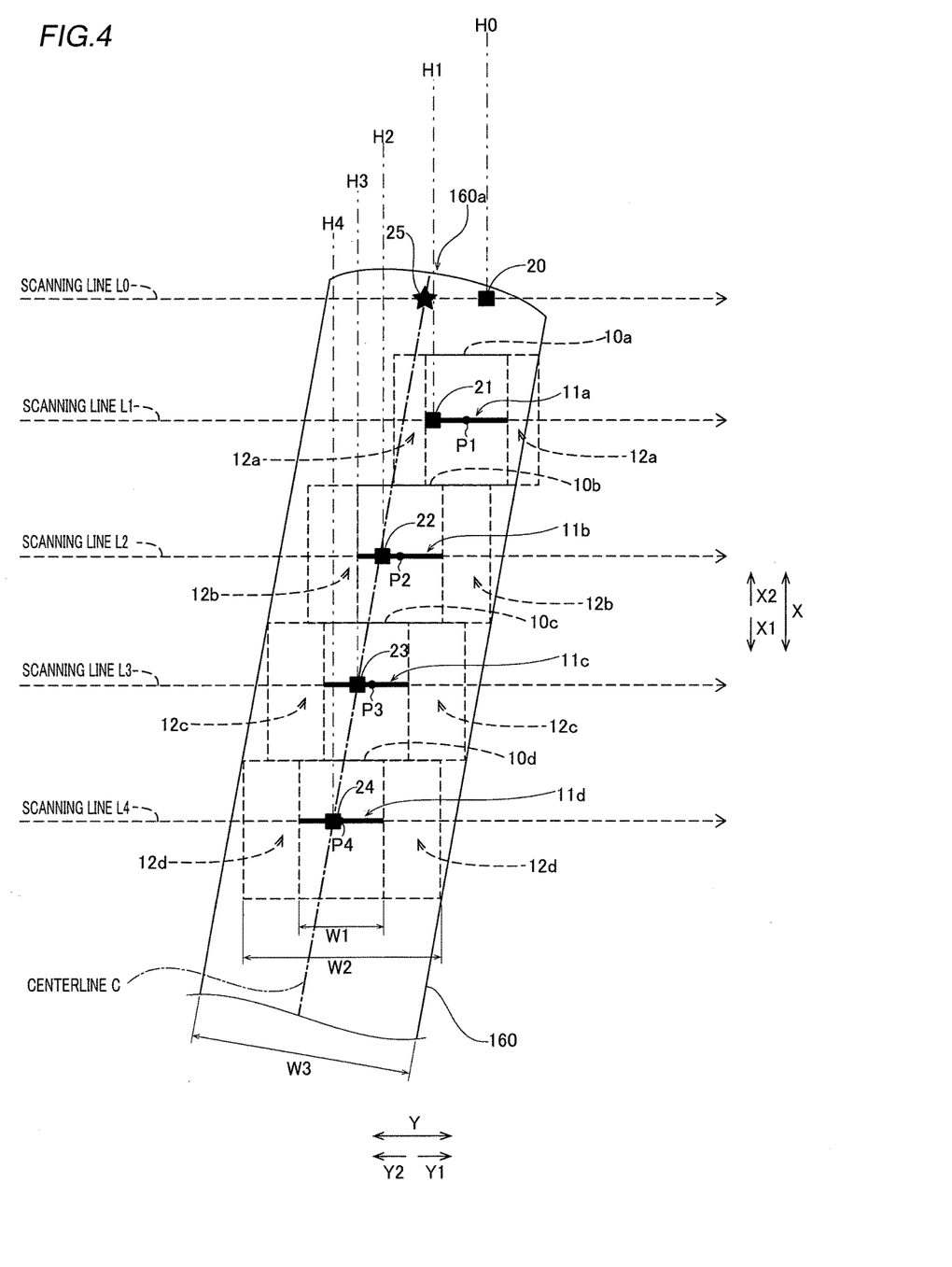
FIG. 4 is an enlarged view of detection sections and adjustment sections of the projector according to the embodiment of the present invention.
Figure 5:
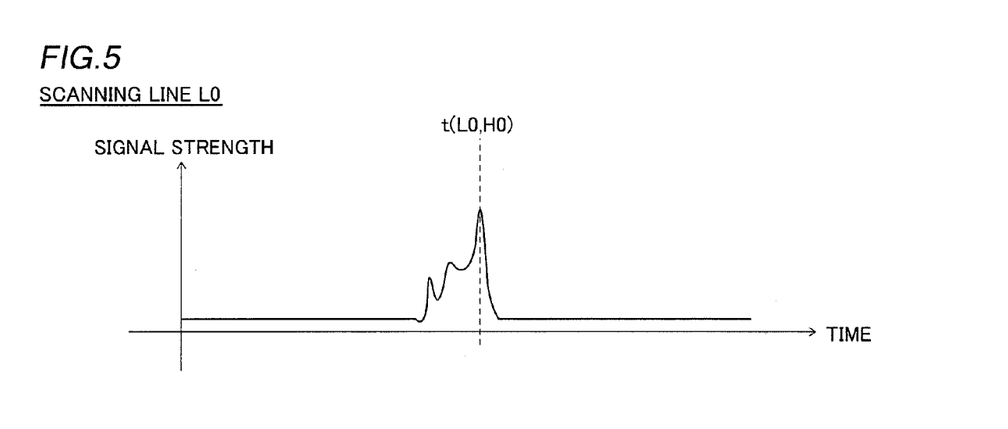
FIG. 5 is a diagram showing a pattern of reflected light detected in a detection section of a scanning line L0 of the projector according to the embodiment of the present invention.

According to this embodiment, the main CPU 101 is configured to predict prediction regions 10a to 10d where the detection object 160 exists on the basis of detection of the detection object 160, change the modulation pattern of the laser beams to a detection object detection pattern when the laser beams are scanned on the prediction regions 10a to 10d, and perform control of acquiring the position of the detection object 160 and setting the position of the detection object 160 to an indication position 25 indicated by the detection object 160 (a position indicated by the tip 160a of the detection object 160) on the basis of the reflected light of the laser beams emitted in the detection object detection pattern, as shown in FIG. 4. The prediction regions 10a to 10d include detection sections 11a to 11d where the modulation pattern of the laser beams is changed to the detection object detection pattern and adjustment sections 12a to 12d where the modulation pattern of the laser beams is changed to an adjustment pattern having a modulation range more restricted than the modulation pattern for forming the image 150b (in an image region). The detection sections 11a to 11d are examples of the "pattern change section" in the present invention.

Specifically, the main CPU 101 is configured to perform control of predicting the prediction region 10a where the detection object 160 exists on the basis of a base point 20 (a detection position detected first) where the detection object 160 is first detected, as shown in FIG. 4. The main CPU 101 is configured to control the modulation pattern to emit a laser beam of a single color (white color, for example) as the detection object detection pattern to the detection sections 11a to 11d. In other words, the main CPU 101 is configured to control the laser beam sources 103 to 105 to change the modulation pattern of the laser beams emitted from the laser beam sources 103 to 105 to the detection object detection pattern of the single color when the laser beams are scanned on the prediction region 10a. More specifically, the main CPU 101 is configured to perform control of changing the modulation pattern of the laser beams to the detection object detection pattern in which the laser beams having constant gradations (B: 255 gradation, G: 255 gradation, and R: 255 gradation, for example) and constant intensity are emitted in the detection sections 11a to 11d. The base point 20 is an example of the "detection position" in the present invention.

The main CPU 101 is configured to detect the position of the detection object 160 by detecting the waveform (signal strength expressed by a function of time) of the reflected light by the light detecting portion 121, as shown in FIGS. 5 to 9. Specifically, the main CPU 101 is configured to acquire the peak position of the signal strength of the reflected light detected by the light detecting portion 121 as the detection position of the detection object 160. In an example shown in FIG. 5, for example, the main CPU 101 is configured to acquire the peak position t (L0, H0) (see FIG. 4) of the signal strength of the reflected light as the detection position (base point 20) of the detection object 160. The light detecting portion 121 detects the reflected light of the laser beams emitted in the image formation pattern for forming the image 150b (corresponding to the image 150b). In this case, a component related to the shape of the detection object 160 and a component related to the image formation pattern are mixed in the reflected light reflected by the detection object 160. The reflected light reflected by the detection object 160 are based on the image formation pattern, and hence it is difficult to clearly detect the component related to the shape of the detection object 160, and the base point 20 different from the original indication position 25 indicated by the detection object 160 is disadvantageously recognized as the indication position indicated by the detection object 160.

Figure 6:
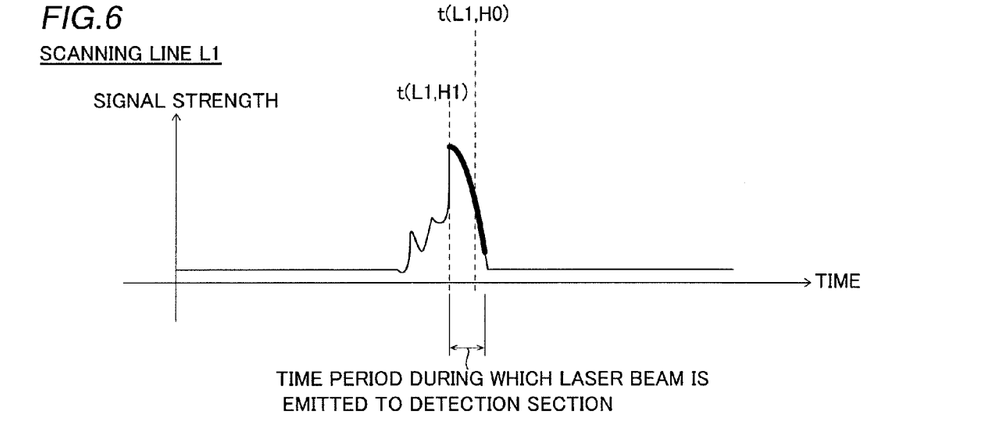
FIG. 6 is a diagram showing a pattern of reflected light detected in a detection section of a scanning line L1 of the projector according to the embodiment of the present invention.

In an example shown in FIG. 6, the light detecting portion 121 detects the reflected light of the laser beams emitted in the image formation pattern, the adjustment pattern, and the detection object detection pattern. The main CPU 101 is configured to acquire the peak position t (L1, H1) (see FIG. 4) of the signal strength of the reflected light as the detection position 21 of the detection object 160. In this case, a component related to the shape of the detection object 160 obtained by reflecting the laser beam (the white laser beam having constant intensity, for example) emitted in the detection object detection pattern and components related to the image formation pattern and the adjustment pattern are mixed in the reflected light reflected by the detection object 160. In this state, the reflected light of the (white) laser beam in the detection object detection pattern is detected.

Figure 7:
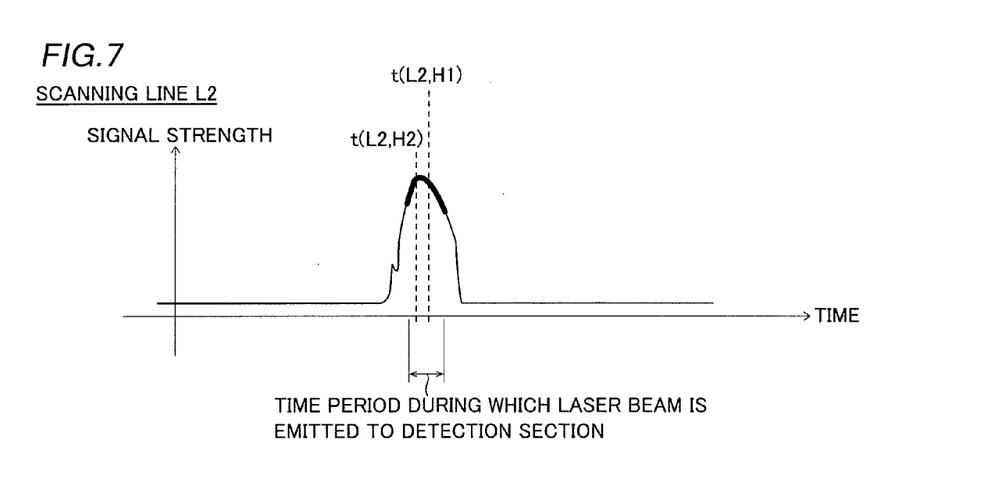
FIG. 7 is a diagram showing a pattern of reflected light detected in a detection section of a scanning line L2 of the projector according to the embodiment of the present invention.
Figure 8:
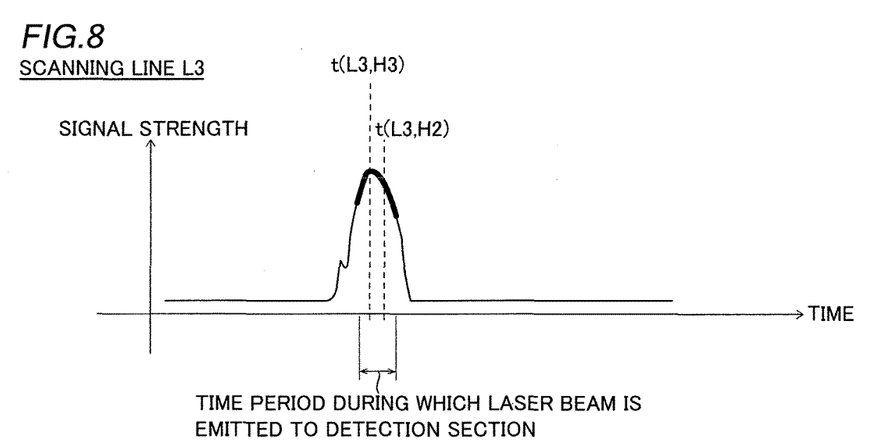
FIG. 8 is a diagram showing a pattern of reflected light detected in a detection section of a scanning line L3 of the projector according to the embodiment of the present invention.
Figure 9:
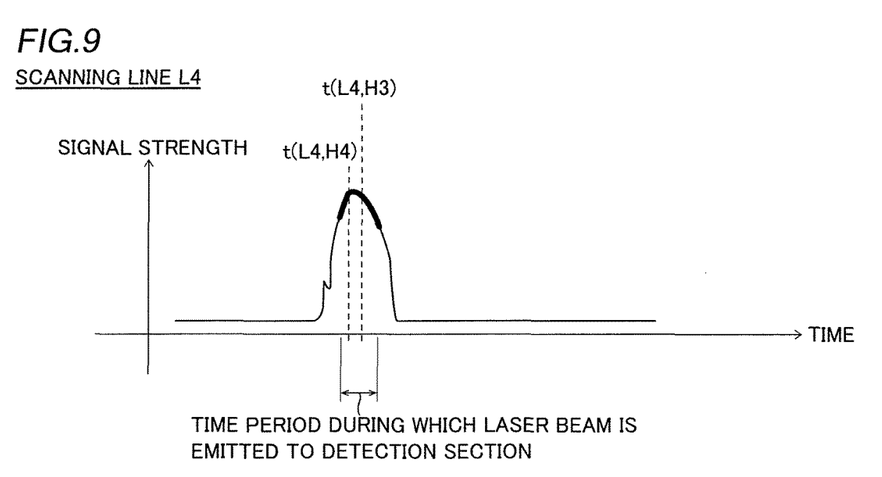
FIG. 9 is a diagram showing a pattern of reflected light detected in a detection section of a scanning line L4 of the projector according to the embodiment of the present invention.

In examples shown in FIGS. 7 to 9, the light detecting portion 121 detects the reflected light of the laser beams emitted in the adjustment pattern and the detection object detection pattern. The main CPU 101 is configured to acquire the peak positions t (L2, H2), t (L3, H3), and t (L4, H4) (see FIG. 4) of the signal strength of the reflected light as the detection positions 22 to 24 of the detection object 160, respectively. In this case, the component related to the shape of the detection object 160 and the component related to the adjustment pattern are mixed in the reflected light reflected by the detection object 160. In this state, the detection object 160 is detected in positions corresponding to substantially central portions of the detection sections 11b to 11d to which the laser beams in the detection object detection pattern are emitted. The reflected light reflected by the detection object 160 is based on the detection object detection pattern, and hence the component related to the shape of the detection object 160 can be clearly detected.

The main CPU 101 is configured to set the detection sections 11a to 11d where the modulation pattern of the laser beams is changed to the detection object detection pattern in the prediction regions 10a to 10d in scanning lines scanned posterior to a prescribed scanning line (scanning line L0, for example) on the basis of detection of the detection object 160 in the prescribed scanning line in an example shown in FIG. 4. Specifically, the main CPU 101 is configured to set the detection sections 11a to 11d in the prediction regions 10a to 10d in a prescribed scanning line L1 and subsequent scanning lines on the basis of the detection of the detection object 160 in the prescribed scanning line L0.

The main CPU 101 is configured to set a detection section in correspondence to the detection position of the detection object 160 in a single scanning line immediately prior to a scanning line in which the detection section is set. In the example shown in FIG. 4, the main CPU 101 is configured to set the detection section 11a of the scanning line L1 in correspondence to the detection position (base point 20) of the detection object 160 in the scanning line L0 immediately prior to the scanning line L1, for example. In other words, the main CPU 101 is configured to set the detection section 11a of the scanning line L1 to intersect with a perpendicular extending downward from the detection position (base point 20) of the detection object 160 in the scanning line L0 to the scanning line L1. More specifically, the main CPU 101 is configured to set the detection section 11a of the scanning line L1 in correspondence to a position deviated by one scan period in the high-speed scanning direction (direction Y) of the laser beam scanning portion 109 from the detection position 20 of the detection object 160 in the scanning line L0. The main CPU 101 is configured to set the detection sections 11b to 11d of the scanning lines L2 to L4 in correspondence to the detection positions 22 to 24, respectively through a procedure similar to the case where the detection section 11a is set in the scanning line L1.

The main CPU 101 is configured to set the detection sections in correspondence to the detection positions of the detection object in a plurality of scanning lines including an immediately prior single scanning line. In the example shown in FIG. 4, the main CPU 101 is configured to set the detection section 11c of the scanning line L3 in correspondence to the detection position 22 of the scanning line L2 immediately prior to the scanning line L3 and the detection position 21 of the scanning line L1, for example. More specifically, the main CPU 101 is configured to set the detection section 11c of the scanning line L3 in a direction in which the detection position 22 of the immediately prior scanning line L2 is shifted (deviated) along the scanning direction (direction Y) of the scanning line from the detection position 21 of the scanning line L1.

The main CPU 101 is configured to perform control of setting the detection sections 11a to 11d in the scanning lines L1 to L4 to have the same width W1 in the example shown in FIG. 4. Furthermore, the main CPU 101 is configured to perform control of setting the width W1 of the detection sections 11a to 11d to be smaller than the width W2 of the prediction regions 10a to 10d of the detection object 160 in the scanning direction (direction Y) of the scanning lines. In other words, the main CPU 101 is configured to perform control of setting the width W1 of the detection sections 11a to 11d not to protrude from the prediction regions 10a to 10d of the detection object 160, respectively, in the scanning direction of the scanning lines. The main CPU 101 is configured to acquire the width W3 of the detection object 160 in the scanning direction of the scanning lines when scanning the scanning lines. The main CPU 101 is configured to perform control of setting the width W2 of the prediction regions 10a to 10d to be smaller than the width W3 of the detection object 160. In addition, the main CPU 101 is configured to set the width W1 of the detection sections 11a to 11d on the basis of information of the width W3 of the detection object 160 detected in the scanning line L0.

Figure 10:
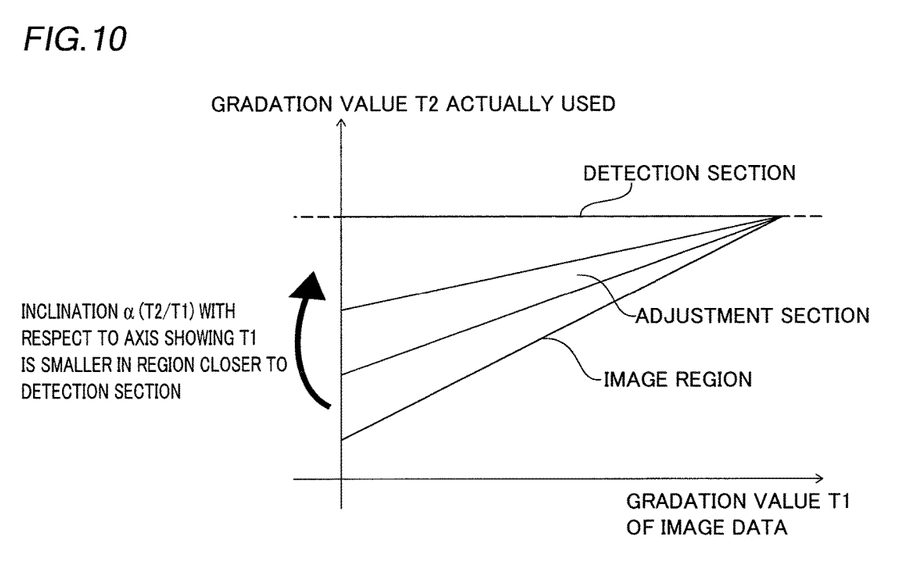
FIG. 10 is a diagram showing change rates of a modulation pattern in the adjustment sections of the projector according to the embodiment of the present invention.

The main CPU 101 is configured to perform control of emitting the laser beams having the modulation range (adjustment pattern) more restricted than the modulation pattern for forming the image 150b to the adjustment sections 12a to 12d located on both sides of the detection sections 11a to 11d in the scanning direction (direction Y) of the scanning lines in the prediction regions 10a to 10d of the detection object 160, as shown in FIG. 4. Furthermore, the main CPU 101 is configured to set a gradation value actually used to be reduced at a constant rate as positions in the adjustment sections 12a to 12d approach the detection sections 11a to 11d from the image region, respectively. Specifically, the main CPU 101 is configured to perform control of emitting the laser beams at gradations smaller than gradations (256 gradations, for example) used in the image region to the adjustment sections 12a to 12d. The main CPU 101 is configured to perform control of emitting the laser beams at smaller gradations to regions of the adjustment sections 12a to 12d closer to the detection sections 11a to 11d, as shown in FIG. 10. More specifically, the modulation range in a prescribed region is derived from the relationship (a ratio T2/T1) between a gradation value T1 (horizontal axis) of image data and a gradation value T2 (vertical axis) actually used. In the modulation range in the prescribed region, the gradation value actually used is more restricted as an inclination a expressed by the ratio T2/T1 to the axis (horizontal axis) showing the aforementioned gradation value T1 is smaller. The main CPU 101 is configured to set the adjustment sections 12a (12b to 12d) having the same width on both sides of the detection section 11a (11b to 11d). Furthermore, the main CPU 101 is configured to change the modulation pattern of the laser beams emitted to the adjustment sections 12a to 12d to the adjustment pattern during a period until a frame subsequent to a frame in which the detection object 160 is detected is displayed after the detection object 160 is detected. The two adjustment sections 12a (12b to 12d) located on both sides in the scanning direction of the scanning line in the prediction region 10a (10b to 10d) have the same width.

The main CPU 101 is configured to change the modulation pattern of the laser beams emitted to the detection sections 11a to 11d to the detection object detection pattern during the period until the frame subsequent to the frame in which the detection object 160 is detected is displayed after the detection object 160 is detected in the example shown in FIG. 4.

The main CPU 101 is configured to detect the detection object 160 in a state where the modulation pattern of the laser beams is set to the image formation pattern and change the modulation pattern of the laser beams to the detection object detection pattern when the laser beams are scanned on the prediction regions 10*a* to 10*d* on the basis of the detection of the detection object 160. In other words, the main CPU 101 is configured to perform control of emitting the laser beams modulated by the image formation pattern until the detection object 160 is first detected (the base point 20 is detected).

The main CPU 101 is configured to acquire a centerline C (see FIG. 4) passing through a substantially central portion (in the scanning direction of the scanning lines) of a region where the detection object 160 exists on the basis of the reflected light of the laser beams in the plurality of scanning lines, emitted in the detection object detection pattern and set the position of the detection object 160 acquired on the basis of the centerline C to the indication position 25 indicated by the detection object 160. Specifically, the main CPU 101 is configured to acquire the centerline C on the basis of the position of the detection object 160 detected in the detection sections in the example shown in FIG. 4. More specifically, the main CPU 101 is configured to acquire the centerline C on the basis of data of the detection position of the detection object 160 in which differences between the detection positions 21 to 24 of the detection object 160 and the center points P1 to P4 of the detection sections 11*a* to 11*d* in the scanning direction of the scanning lines are not more than a prescribed value (a half of the width W1 of the detection sections 11*a* to 11*d*, for example).

The main CPU 101 is configured to perform control of acquiring the centerline C passing through the substantially central portion of the region where the detection object 160 exists on the basis of accumulation of at least a prescribed number of (ten, for example) the data of the detection position of the detection object 160 in which the differences between the detection positions 21 to 24 of the detection object 160 and the center points P1 to P4 of the detection sections 11*a* to 11*d* in the scanning direction (direction Y) of the scanning lines are not more than the prescribed value in the example shown in FIG. 4. More specifically, the main CPU 101 is configured to perform control of acquiring the centerline C predicted (presumed) to correspond to the center of the detection object 160 in a short-side direction (direction Y) by statistically processing the accumulated data of the detection position of the detection object 160 in which the differences between the detection positions 21 to 24 of the detection object 160 and the center points P1 to P4 of the detection sections 11*a* to 11*d* are not more than the prescribed value by a least squares method, for example.

The main CPU 101 is configured to set an intersection between the centerline C and the first scanning line L0 in which the detection object 160 is detected to the indication position 25 indicated by the detection object 160 in the example shown in FIG. 4. More specifically, the main CPU 101 is configured to set the intersection between the centerline C and the scanning line L0 in which the base point 20 is located to the indication position 25 indicated by the detection object 160.

The storage portion 123 includes a non-volatile memory. The storage portion 123 is configured to accumulate (store) the data of the detection position of the detection object 160 in which the differences between the detection positions of the detection object 160 and the center points of the detection sections in the scanning direction of the scanning lines are not more than the prescribed value and so on.

Figure 11:
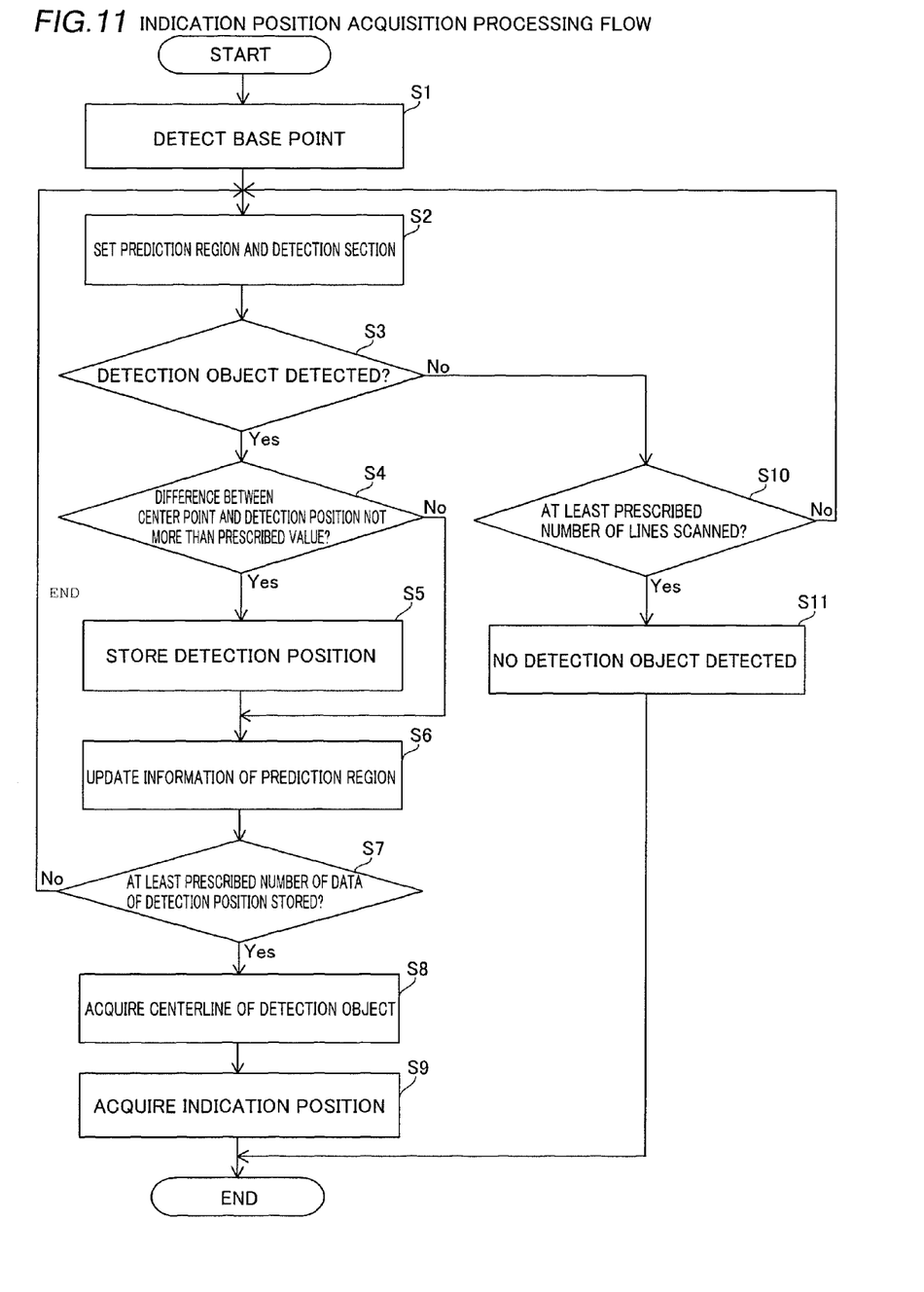
FIG. 11 is a flowchart for illustrating indication position acquisition processing performed by the projector according to the embodiment of the present invention.

Indication position acquisition processing in the projector 1 according to this embodiment is now described with reference to FIG. 11. The processing in the projector 1 is performed by the main CPU 101.

First, the base point 20 of the detection object 160 is detected at a step S1. Specifically, a position where the detection object 160 is first detected is detected as the base point 20 with the reflected light of the laser beams emitted in the modulation pattern for forming the image 150*b* (in the image region).

Next, the main CPU 101 sets the prediction region and the detection section at a step S2. Specifically, the main CPU 101 sets the prediction region 10*a* and the detection section 11*a* set in the prediction region 10*a* on the basis of information of the base point 20 when the detection object 160 is first detected. Furthermore, the main CPU 101 sets the prediction regions and the detection sections on the basis of the base point 20 of the detection object 160 in the scanning line immediately prior to each of the scanning lines L2 to L4 in which the prediction regions 10*b* to 10*d* and the detection sections 11*b* to 11*d* are set and the detection positions 21 to 23 when this is the second or subsequent time to detect the detection object 160.

Then, the main CPU 101 determines whether or not the detection object 160 has been detected at a step S3. When determining that the detection object 160 has been detected, the main CPU 101 advances to a step S4. When determining that the detection object 160 has not been detected, on the other hand, the main CPU 101 advances to a step S10.

Then, the main CPU 101 determines whether or not the differences between the detection positions (detection positions 21 to 24, for example) of the detection object 160 and the center points (P1 to P4, for example) of the detection sections are not more than the prescribed value at the step S4. When determining that the differences between the detection positions of the detection object 160 and the center points of the detection sections are not more than the prescribed value, the main CPU 101 advances to a step S5, and the detection positions of the detection object 160 are stored (accumulated) in the storage portion 123. When determining that the differences between the detection positions of the detection object 160 and the center points of the detection sections are more than the prescribed value, on the other hand, the main CPU 101 advances to a step S6.

Then, information of the prediction regions is updated at the step S6. The information of the prediction regions is updated such that the prediction region 10*c* is shifted from the prediction region 10*b* of the scanning line L2 in a direction in which the detection position 21 of the scanning line L1 that is two scanning lines before the scanning line L3 is shifted (deviated) to the detection position 22 of the scanning line L2 immediately prior to the scanning line L3 along the scanning direction of the scanning lines when the prediction region 10*c* of the scanning line L3 is set, for example.

Then, the main CPU 101 determines whether or not at least the prescribed number of (ten, for example) the data of the detection positions of the detection object 160 are stored at a step S7. When determining that at least the prescribed number of the data of the detection positions of the detection object 160 are stored, the main CPU 101 advances to a step S8. When determining that at least the prescribed number of the data of the detection positions of the detection object 160 are not stored (when the number of the stored data of the detection positions of the detection object 160 is less than ten), on the other hand, the main CPU 101 returns to the step S2.

Then, the main CPU 101 acquires the centerline C of the detection object 160 at the step S8. Specifically, the main CPU 101 statistically processes the data of the detection positions of the detection object 160 stored in the storage portion 123 to acquire the centerline C.

Then, the main CPU 101 acquires the indication position 25 indicated by the detection object 160 at a step S9. Specifically, the main CPU 101 acquires the intersection between the centerline C and the scanning line L0 in which the base point 20 is located as the indication position 25 indicated by the detection object 160. Thereafter, the indication position acquisition processing is terminated.

At a step S10, the main CPU 101 determines whether or not at least a prescribed number of (ten, for example) lines have been scanned. Specifically, when determining that at least the prescribed number of lines have not been scanned, the main CPU 101 returns to the step S2. When determining that at least the prescribed number of lines have been scanned, on the other hand, the main CPU 101 advances to a step S11 and determines that the detection object 160 has not been detected. Thereafter, the indication position acquisition processing is terminated.

According to this embodiment, as hereinabove described, the projector 1 is provided with the CPU 101 performing control of predicting the prediction regions 10*a* to 10*d* where the detection object 160 exists on the basis of the detection of the detection object 160, changing the modulation pattern of the laser beams to the detection object detection pattern when the laser beams are scanned on the prediction regions 10*a* to 10*d*, acquiring the position of the detection object 160 on the basis of the reflected light of the laser beams emitted in the detection object detection pattern, and setting the position of the detection object 160 to the indication position 25 indicated by the detection object 160. Thus, the laser beams changed to the detection object detection pattern suitable to detect the detection object 160 are emitted to the prediction regions 10*a* to 10*d* where the detection object 160 is predicted to exist, and hence the component related to the shape of the detection object 160 can be clearly detected, unlike the case where the position of the detection object 160 is acquired on the basis of the reflected light in the modulation pattern (image formation pattern) changing according to a change in the image 150*b*. Consequently, the indication position 25 indicated by the detection object 160 can be accurately acquired. Furthermore, the position of the detection object 160 is acquired and set to the indication position 25 indicated by the detection object 160 on the basis of the laser beams changed from the image formation pattern to the detection object detection pattern, and hence no dedicated laser beam source for detection different from the laser beam sources for image formation may be provided, and hence complication of the structure of the projector 1 can be suppressed. In addition, no laser beam for detection may be emitted to the image 150*b*, and hence difficulty in visually confirming the image 150*b* resulting from the laser beam for detection can be suppressed. Moreover, the indication position 25 indicated by the detection object 160 can be acquired by emitting the laser beams changed to the detection object detection pattern to the prediction regions 10*a* to 10*d* where the detection object 160 is predicted to exist, and hence the indication position 25 indicated by the detection object 160 can be accurately acquired even in the case where the detection object 160 exists at an arbitrary position in the projection surface 150*a*, unlike the case where the laser beam for detection is emitted only to a part of the projection surface 150*a*.

According to this embodiment, as hereinabove described, the main CPU 101 is configured to detect the detection object 160 in the state where the modulation pattern of the laser beams is set to the image formation pattern and change the modulation pattern of the laser beams to the detection object detection pattern when the laser beams are scanned on the prediction regions 10*a* to 10*d* on the basis of the detection of the detection object 160. Thus, emission of the laser beams in the detection object detection pattern before the detection of the detection object 160 can be suppressed, and hence inclusion of noise (pattern) in the image 150*b* projected on the projection surface 150*a* resulting from the emission of the laser beams in the detection object detection pattern can be suppressed.

According to this embodiment, as hereinabove described, the main CPU 101 is configured to acquire the centerline C passing through the substantially central portion of the region where the detection object 160 exists on the basis of the reflected light of the laser beams emitted in the detection object detection pattern and set the position of the detection object 160 acquired on the basis of the centerline C to the indication position 25 indicated by the detection object 160. Thus, the indication position 25 indicated by the detection object 160 can be easily accurately acquired on the basis of the centerline C.

According to this embodiment, as hereinabove described, the main CPU 101 is configured to set the intersection between the centerline C and the first scanning line L0 in which the detection object 160 is detected to the indication position 25 indicated by the detection object 160. Thus, the tip 160*a* of the detection object 160 can be acquired as the indication position 25 on the basis of the centerline C and the first scanning line L0 in which the detection object 160 is detected, and hence the indication position 25 indicated by the tip 160*a* of the detection object 160 can be accurately acquired.

According to this embodiment, as hereinabove described, the main CPU 101 is configured to acquire the centerline C on the basis of the reflected light of the laser beams emitted in the detection object detection pattern in the plurality of scanning lines. Thus, the number of the reflected laser beams employed to acquire the centerline C can be increased, and hence the centerline C can be accurately acquired.

According to this embodiment, as hereinabove described, the main CPU 101 is configured to set the detection sections 11*a* to 11*d* in which the modulation pattern of the laser beams is changed to the detection object detection pattern in the prediction regions 10*a* to 10*d* in the scanning lines scanned subsequent to the prescribed scanning line on the basis of the detection of the detection object 160 in the prescribed scanning line. Thus, the detection sections 11*a* to 11*d* can be set in the scanning lines subsequent to the prescribed scanning line in a direction in which the detection object 160 is predicted to extend after the detection object 160 is detected, and hence the indication position 25 indicated by the detection object 160 can be more accurately acquired.

According to this embodiment, as hereinabove described, the main CPU 101 is configured to control the modulation pattern to emit the white laser beam to the detection sections 11*a* to 11*d*. Thus, the position of the detection object 160 can be acquired and set to the indication position 25 indicated by the detection object 160 on the basis of only the laser beam of the single color remaining unchanged in color (having constant gradations), and hence the indication position 25 indicated by the detection object 160 can be more accurately acquired. Furthermore, even in the case where the detection sections 11a to 11d are set in a state deviated from the detection object 160, a reduction in the quality of the image 150b can be suppressed while the indication position 25 indicated by the detection object 160 is accurately acquired when the white laser beam is emitted.

According to this embodiment, as hereinabove described, the projector 1 is provided with the laser beam sources 103 to 105 emitting the laser beams of colors different from each other to the laser beam scanning portion 109, and the main CPU 101 is configured to control the laser beam sources 103 to 105 to change the modulation pattern of the laser beams emitted from the laser beam sources 103 to 105 to the detection object detection pattern of the single color when the laser beams are scanned on the prediction regions 10a to 10d. Thus, the indication position 25 indicated by the detection object 160 in the image 150b displayed in colors can be accurately acquired.

According to this embodiment, as hereinabove described, the main CPU 101 is configured to set the detection sections 11a to 11d in correspondence to the detection position of the detection object 160 in the single scanning line immediately prior to the scanning line in which each of the detection sections 11a to 11d is set. Thus, the detection sections 11a to 11d can be easily set by setting the prediction regions 10a to 10d in a direction along the detection object 160, and hence setting of the detection sections 11a to 11d at positions not corresponding to the detection object 160 can be easily suppressed.

According to this embodiment, as hereinabove described, the main CPU 101 is configured to set the detection sections 11a to 11d in correspondence to the detection positions of the detection object 160 in the plurality of scanning lines including the immediately prior single scanning line. Thus, the setting of the detection sections 11a to 11d at the positions not corresponding to the detection object 160 can be more easily suppressed.

According to this embodiment, as hereinabove described, the main CPU 101 is configured to perform control of setting the width of the detection sections 11a to 11d to be smaller than the width of the prediction regions 10a to 10d of the detection object 160 in the scanning direction of the scanning lines. Thus, protrusion of the laser beams emitted in the detection object detection pattern from the prediction regions 10a to 10d can be suppressed, and hence inclusion of noise in the image 150b projected on the projection surface 150a resulting from the protrusion of the laser beams in the detection object detection pattern from the prediction regions 10a to 10d can be suppressed.

According to this embodiment, as hereinabove described, the main CPU 101 is configured to perform control of emitting the laser beams having the modulation range more restricted than the modulation pattern of the image region where the image 150b is formed to the adjustment sections 12a to 12d located on both sides of the detection sections 11a to 11d in the prediction regions 10a to 10d of the detection object 160. Thus, the adjustment sections 12a to 12d located on both sides of the detection sections 11a to 11d are provided, whereby the laser beams in the image formation pattern can be brought close to laser beams in the detection object detection pattern in sections between the detection sections 11a to 11d and the image region, and hence the image 150b can be visually confirmed without a sense of incongruity.

According to this embodiment, as hereinabove described, the main CPU 101 is configured to restrict the gradation values of the laser beams emitted to the regions of the adjustment sections 12a to 12d closer to the detection sections 11a to 11d to be smaller. Thus, a change in color per gradation can be reduced, and hence the adjustment sections 12a to 12d are provided, whereby the laser beams in the image formation pattern can be gradually brought close to the laser beams in the detection object detection pattern in the sections between the detection sections 11a to 11d and the image region.

According to this embodiment, as hereinabove described, the adjustment sections 12a to 12d located on both sides of the detection sections 11a to 11d have substantially the same width in the scanning direction of the scanning lines. Thus, the adjustment sections 12a to 12d can be arranged on both sides of the detection sections 11a to 11d in a balanced manner.

According to this embodiment, as hereinabove described, the main CPU 101 is configured to change the modulation pattern of the laser beams emitted to the detection sections 11a to 11d to the detection object detection pattern during the period until the frame subsequent to the frame in which the detection object 160 is detected is displayed after the detection object 160 is detected. Thus, the overall detection object 160 in the frame can be easily detected with the laser beams changed from the modulation pattern to the detection object detection pattern.

According to this embodiment, as hereinabove described, the main CPU 101 is configured to acquire the centerline C passing through the substantially central portion of the region where the detection object 160 exists on the basis of the data of the detection position of the detection object 160 in the case where the differences between the detection positions of the detection object 160 and the positions of the center points P1 to P4 of the detection sections 11a to 11d in the scanning direction of the scanning lines are not more than the prescribed value. Thus, the accuracy of the acquired centerline C can be improved by excluding data of the detection position of the detection object 160 based on reflected light in the detection object detection pattern acquired in the case where the differences between the detection positions of the detection object 160 and the positions of the center points P1 to P4 of the detection sections 11a to 11d in the scanning direction of the scanning lines are more than the prescribed value (in the case where the detection object 160 is in a section (place) other than the detection sections 11a to 11d, for example).

According to this embodiment, as hereinabove described, the main CPU 101 is configured to perform control of acquiring the width of the detection object 160 in the scanning direction and setting the width of the detection sections 11a to 11d to be smaller than the width of the detection object 160 in a direction along the scanning direction. Thus, protrusion of the laser beams emitted in the detection object detection pattern from the detection object 160 can be suppressed, and hence the reduction in the quality of the image 150b resulting from the protrusion of the laser beams in the detection object detection pattern from the detection object 160 can be suppressed.

The embodiment disclosed this time must be considered as illustrative in all points and not restrictive. The range of the present invention is shown not by the above description of the embodiment but by the scope of claims for patent, and all modifications within the meaning and range equivalent to the scope of claims for patent are further included.

For example, while the present invention is applied to the projector in the aforementioned embodiment, the present invention is not restricted to this. The present invention may alternatively be applied to an electronic device having a projector function other than the projector, such as a smartphone, for example.

While the prediction region is set with respect to the single scanning line (the scanning line L1, for example) immediately subsequent to the prescribed scanning line (the scanning line L0, for example) on the basis of the detection position of the detection object in the prescribed scanning line in the aforementioned embodiment, the present invention is not restricted to this. According to the present invention, the prediction regions may alternatively be set with respect to the plurality of scanning lines immediately subsequent to the prescribed scanning line on the basis of the detection position of the detection object in the prescribed scanning line.

While the centerline C passing through the substantially central portion of the region where the detection object exists is acquire (calculated), and the indication position indicated by the detection object is acquired on the basis of the acquired centerline C in the aforementioned embodiment, the present invention is not restricted to this. According to the present invention, the indication position indicated by the detection object may alternatively be acquired without acquiring the centerline.

While the white laser beam as the laser beam of a single color according to the present invention is emitted to the detection sections (pattern change section) in the aforementioned embodiment, the present invention is not restricted to this. According to the present invention, a red laser beam other than the white laser beam, for example, may alternatively be emitted to the pattern change section so far as the same is a laser beam of a single color.

While the width of the detection sections (pattern change section) is constant in the scanning direction of the scanning lines in the aforementioned embodiment, the present invention is not restricted to this. According to the present invention, the width of the pattern change section may alternatively be gradually increased in the scanning direction of the scanning lines. Thus, the detection object can be easily detected in the pattern change section. The pattern change section is preferably set within the range of the detection object.

While the adjustment sections are set on both sides of the detection sections (pattern change section) in the aforementioned embodiment, the present invention is not restricted to this. According to the present invention, the adjustment sections may not be set on both sides of the pattern change section.

While the adjustment sections having the same width are set on both sides of the detection sections (pattern change section) in the aforementioned embodiment, the present invention is not restricted to this. According to the present invention, adjustment sections having widths different from each other may alternatively be set on both sides of the pattern change section.

While the detection sections (pattern change section) are set on the basis of the detection of the detection object in the aforementioned embodiment, the present invention is not restricted to this. According to the present invention, the pattern change section may alternatively be set on the basis of the detection of the detection object and the acquired information of the detection object in a prior frame. Thus, the pattern change section can be set at a proper position on the basis of the detection of the detection object and the acquired information of the detection object in the prior frame.

While the processing operations of the control portion are described, using the flowcharts described in an event-driven manner at the start and described in a flow-driven manner after the start for the convenience of illustration in the aforementioned embodiment, the present invention is not restricted to this. The processing operations of the control portion may alternatively be performed in a complete event-driven manner, in a complete flow-driven manner, or in a parallel processing manner.

What is claimed is:

1. A projector comprising:
   a laser beam scanning portion scanning a laser beam having a first characteristic that forms an image on a projection surface;
   a light detecting portion receiving reflected light of the laser beam scanned by the laser beam scanning portion, reflected by a detection object; and
   a control portion performing control of predicting a region where the detection object exists on the basis of detection of the detection object, changing a characteristic of the laser beam to a second characteristic when the laser beam is scanned on the region, acquiring a position of the detection object on the basis of the reflected light of the laser beam emitted with the second characteristic, and setting the position of the detection object to an indication position indicated by the detection object;
   wherein the control portion acquires a centerline passing through a substantially central portion of a region where the detection object exists by the reflected light of the laser beam emitted with the second characteristic and sets the position of the detection object acquired on the basis of the centerline to the indication position indicated by the detection object.

2. The projector according to claim 1, wherein the control portion detects the detection object in a state where the characteristic of the laser beam is set to the first characteristic and changes the characteristic of the laser beam to the second characteristic when the laser beam is scanned on the region on the basis of the detection of the detection object.

3. The projector according to claim 1, wherein the control portion sets an intersection between the centerline and a first scanning line in which the detection object is detected to the indication position indicated by the detection object.

4. The projector according to claim 1, wherein the control portion acquires the centerline on the basis of the reflected light of the laser beam emitted with the second characteristic in each of a plurality of scanning lines.

5. The projector according to claim 1, wherein the control portion sets a characteristic change section in which the characteristic of the laser beam is changed to the second characteristic in the region in a scanning line scanned subsequent to a prescribed scanning line on the basis of the detection of the detection object in the prescribed scanning line.

6. The projector according to claim 5, wherein the control portion controls the characteristic to emit the laser beam of a single color as the second characteristic to the characteristic change section.

7. The projector according to claim 6, wherein
the control portion controls the characteristic to emit the laser beam of a white or red color as the second characteristic.

8. The projector according to claim 6, further comprising red, green, and blue laser beam sources emitting laser beams of colors different from each other to the laser beam scanning portion, wherein
the control portion controls the red, green, and blue laser beam sources to change the characteristic of the laser beams emitted from the red, green, and blue laser beam sources to the second characteristic of the single color when the laser beams are scanned on the region.

9. The projector according to claim 5, wherein
the control portion sets the characteristic change section in correspondence to a detection position of the detection object in at least a single scanning line immediately prior to a scanning line in which the characteristic change section is set.

10. The projector according to claim 9, wherein
the control portion sets the characteristic change section in correspondence to detection positions of the detection object in a plurality of scanning lines including an immediately prior single scanning line.

11. The projector according to claim 5, wherein
the control portion performs control of setting a width of the characteristic change section to be smaller than a width of the region of the detection object in a scanning direction of the scanning line.

12. The projector according to claim 11, wherein
the characteristic change section includes a detection section in which the characteristic of the laser beam is changed to the second characteristic, and
the control portion performs control of emitting the laser beam having a modulation range more restricted than the characteristic of an image region where the image is formed to adjustment sections located on both sides of the detection section in the region of the detection object.

13. The projector according to claim 12, wherein
the control portion restricts a gradation value of the laser beam emitted to regions of the adjustment sections closer to the detection section to be smaller.

14. The projector according to claim 12, wherein
the adjustment sections located on both sides of the detection section have widths substantially equal to each other in the scanning direction of the scanning line.

15. The projector according to claim 5, wherein
the control portion changes the characteristic of the laser beam emitted to the characteristic change section to the second characteristic during a period until a frame subsequent to a frame in which the detection object is detected is displayed after the detection object is detected.

16. The projector according to claim 5, wherein
the control portion sets the characteristic change section on the basis of acquired information of the detection object in a frame prior to a frame in which the detection object is detected when the indication position indicated by the detection object is acquired in the frame prior to the frame in which the detection object is detected.

17. The projector according to claim 12, wherein
the control portion acquires the centerline passing through the substantially central portion of the region where the detection object exists on the basis of data of a detection position of the detection object in a case where a difference between the detection position of the detection object and a position of a center point of the detection section in the scanning direction of the scanning line is not more than a prescribed value.

18. The projector according to claim 5, wherein
the control portion performs control of acquiring a width of the detection object in the scanning direction and setting a width of the characteristic change section to be smaller than a width of the detection object in a direction along the scanning direction.

19. A projector comprising:
a laser beam scanning portion scanning a laser beam having a first characteristic that forms an image on a projection surface;
a light detecting portion receiving reflected light of the laser beam scanned by the laser beam scanning portion, reflected by a detection object; and
a control portion that acquires a centerline of the detection object and sets the position of the detection object acquired on the basis of the centerline to an indication position indicated by the detection object, wherein
the control portion controls predicting a region where the detection object exists on the basis of detection of the detection object, and changes a characteristic of the laser beam to a second characteristic when the laser beam is scanned on the region.

20. The projector according to claim 19, wherein
the control portion acquires a position of the detection object on the basis of the reflected light of the laser beam emitted with the second characteristic, and sets the position of the detection object to the indication position indicated by the detection object.

21. A projector comprising:
a laser beam scanning portion scanning a laser beam having a first characteristic that forms an image on a projection surface;
a light detecting portion receiving reflected light of the laser beam scanned by the laser beam scanning portion, reflected by a detection object; and
a control portion performing control of predicting a region where the detection object exists on the basis of detection of the detection object, changing a characteristic of the laser beam to a second characteristic when the laser beam is scanned on the region, acquiring a position of the detection object on the basis of the reflected light of the laser beam emitted in the second characteristic, and setting the position of the detection object to an indication position indicated by the detection object,
wherein the control portion changes the characteristic of the laser beam to the second characteristic in the region in a scanning line scanned subsequent to a prescribed scanning line where the detection object is detected.

* * * * *